United States Patent [19]

Pike et al.

[11] 3,753,434

[45] Aug. 21, 1973

[54] ELECTRONIC DEVICE FOR MEASURING PENETRATION OF TOOTH ROOT CANAL AND ENDODONTIC THERAPY METHOD

[76] Inventors: James L. Pike, 2115 E. Lavendale, San Antonio, Tex. 78209; Polk W. Cash, 9714 La Rue, San Antonio, Tex. 78217

[22] Filed: Aug. 23, 1971

[21] Appl. No.: 173,775

[52] U.S. Cl................ 128/2.1 Z, 32/40 R, 128/2 S
[51] Int. Cl.............................................. A61b 5/05
[58] Field of Search...................... 128/2.1 E, 2.1 Z, 128/2.1 R, 2 S, 2 N, 2 R; 32/47, 57; 33/174 D

[56] References Cited
UNITED STATES PATENTS

| | | | |
|---|---|---|---|
| 3,660,901 | 5/1972 | Inoue | 128/2 S X |
| 2,684,670 | 7/1954 | Mathison | 128/2.1 Z |
| 2,736,313 | 2/1956 | Mathison | 128/2.1 Z |
| 3,058,225 | 10/1962 | Ward | 128/2 S X |
| 2,012,316 | 8/1935 | Miles | 128/2 R X |
| 2,734,166 | 2/1956 | Hooker | 128/2.1 Z X |

*Primary Examiner*—Kyle L. Howell
*Attorney*—Willard J. Hodges, Jr.

[57] ABSTRACT

An electronic device for accurately determining the point of penetration of root canal and contacting of peridontal tissue. The device is battery powered fed through a tickle oscillator conductively connected to a probe diode bridge meter circuit utilized for accurately measuring conductivity between the root canal area and body tissue of the mouth. Potentiometers are provided for adjusting and balancing circuits to insure accuracy of measurements. The method and utilization includes not only measurements of penetration of root canal to peridontal tissue but also provides determination of effectiveness of seal of silver points in restoration as well as disclosing cracked teeth and secondary canals.

9 Claims, 8 Drawing Figures

CIRCUIT A  CIRCUIT B  PROBES

INVENTORS
JAMES L. PIKE
POLK W. CASH

ELECTRONIC DEVICE FOR MEASURING PENETRATION OF TOOTH ROOT CANAL AND ENDODONTIC THERAPY METHOD

BACKGROUND OF THE INVENTION

1. Field Invention

This invention pertains to an improved dental method and process and associated electronic instrument for performing a root canal restoration. The primary purpose of the device is the determination of the exact point of contact of periodontal membrane. The device has related and associated uses such as assisting in fitting and sealing of silver points and retention pins, detecting and locating accessory canals and fractured tooth structures as well as measurement of the effectiveness of the seals of silver points.

2. Description and Prior Art

Heretofore, usual operating procedure, root canal restoration including the drilling and removing of portions of the crown of the tooth and drilling and filing of the root canal area. The depth of penetration of the file was determined by x-ray. In restorative procedure, the penetration of silver point was also determined by x-ray. Inspection and professional study of x-rays determined depth of penetration and effectiveness of seals and restoration. The primary object of the concept and development of this device was a measuring device and method to reduce the time and length of the operative procedure as well as improved quality of the results obtained.

SUMMARY OF THE INVENTION

The device of this invention and method of use employs two 1½ volt batteries as the source of the power supply. The current feeds through a tickle oscillator whose frequency is controlled primarily by the inductance of a transformer in conjunction with capacitors and regenerative feed back, sustains oscillation through transformer winding, between base and emitter of a transistor. The output is fed through a diode bridge and a meter reads the rectified alternating current as a direct current to measure the conductivity between a tooth probe and a ground probe in the saliva of the mouth. For a detailed description of the invention and its method of use, reference is made to the attached various views wherein like reference characters will be utilized throughout the drawings and the detailed description of the preferred embodiment.

The preferred production model is a printed circuit mounted in a compact case for ease of handling, appearance, and accessibility of use. Only those components requiring ready access are externally mounted.

Figure 1:
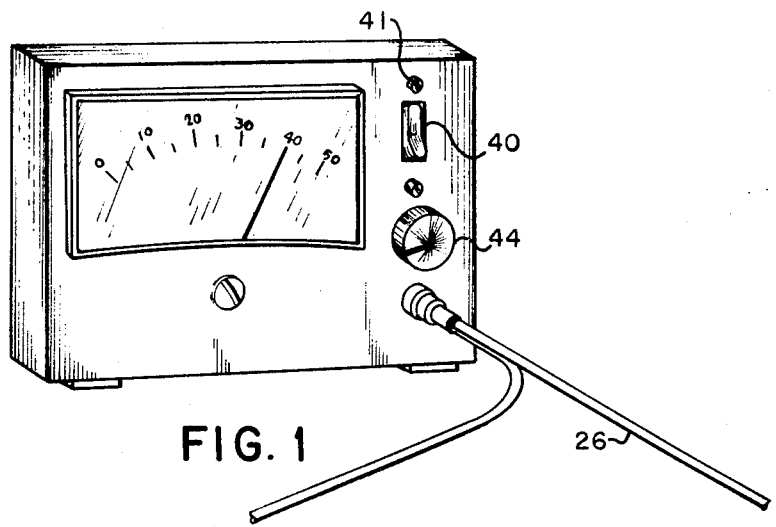
FIG. 1 is a perspective view of the device disclosing principally micro-amp meter, the external contacts and insulated probes.
Figure 4:
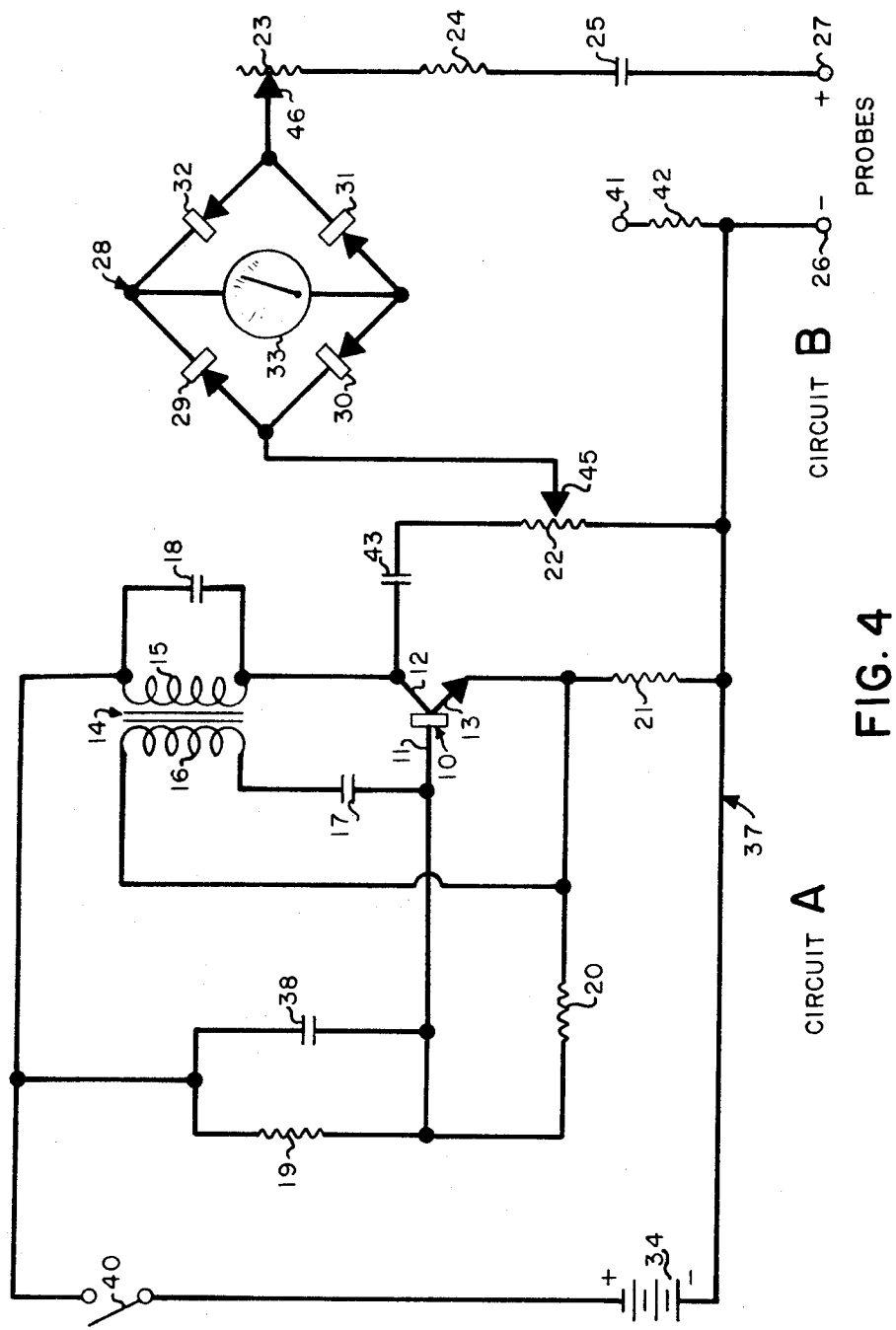
FIG. 4 is a circuit diagram of the preferred embodiment of the device.
Figure 5:
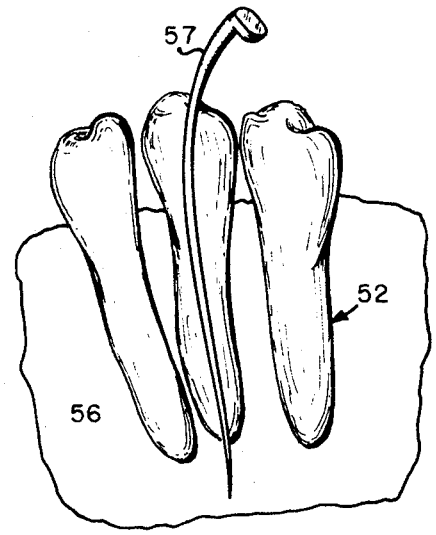
FIG. 5 is a schematic x-ray illustration of a silver point over penetration of a tooth into the periodontal tissue.
Figure 6:
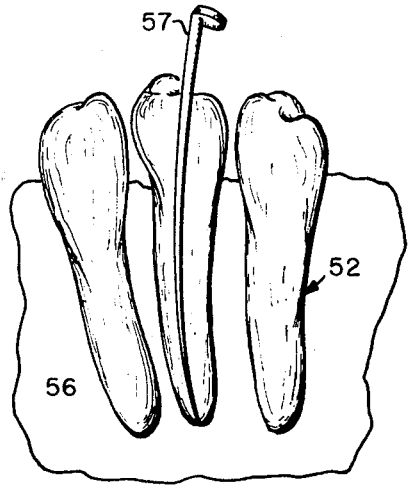
FIG. 6 is a schematic x-ray illustrating the preferred depth of penetration of a silver point.

The specific arrangement of the various components is relatively optional for a description of the construction of the device and the arrangement of the electrical components, reference is particularly made to FIGS. 1 and 4. The circuitry comprises a tickle oscillator power circuit A and a measuring circuit B. The circuit is constructed around a silicon transistor 10 comprising a base 11, a collector 12 and an emitter 13. The collector is conductively attached to the primary winding 15 of transformer 14. The ends of winding 15 are loop connected through a 1 MFD capacitor 18. The inductance winding 16 is connected to the base 11 of transistor 10 through a 0.01 MFD base capacitor 17. Two 10,000 ohm one-fourth watt resistors and one 10 ohm one-fourth resistor are utilized to bias the transistor 10. The first in the series is resistor 19 wired in parallel with a 1 MFD capacitor 38, resistor 20 interconnects base 11 of transistor 10 and emitter 13, and the 10 ohm one-fourth watt resistor 21 interconnects the emitter 13 to ground 37. Power to Circuit A is supplied from two 1½ volt batteries 34 with the negative side to ground 37. For convenience of operation of on-off switch 40 is provided.

Power Circuit A and measuring Circuit B are interconnected through a 10 MFD capacitor 43 interconnected through a 2,000 ohm potentiometer 22 to ground 37 with the pick-up contact 45 of potentiometer 22 conductively connected to silocon diodes 29, 30, 31, and 32. The diodes are so arranged that 29 and 31 pass current through the meter 33 on the positive half cycle and diodes 30 and 32 pass current to the meter on the negative half cycle. The diode meter measuring circuit 28 is connected through the pick-up contact 46 to a 3,000 ohm potentiometer 23 which is in turn conductively connected through a 20,000 ohm one-fourth watt 1 percent resistor to a 2 MFD capacitor 25 leading to the positive probe 27. The device could be constructed with hand wired circuit; however, a solid state printed circuit was used in the preferred embodiment.

Figure 3:
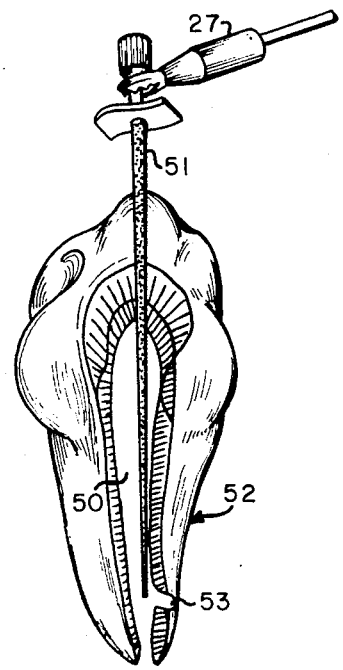
FIG. 3 is a sectional view of a tooth with a root canal file inserted in a simulated operative procedure illustrating the point of contact of an accessory canal.

The electronics of the device operates substantially as follows:

The system is composed of two circuits as shown in FIG. 3. Circuit A is essentially an oscillator whose frequency is controlled mainly by inductance of transformer 14 winding 15 and the capacitance of capacitor 18. Regenerative feed back, to sustain oscillation, is obtained through inductance winding 16 of transformer 14 between the base 11 and emitter 13 of transistor 10.

The output of Circuit A is coupled to the probe-meter circuit, Circuit B, by means of capacitor 43. By means of the diode bridge (29, 30, 31 and 32), meter 33 reads the current (alternating) in Circuit B.

Transistor 10 is operating in the common-base or grounded base configuration. The proper DC bias between the collector 12, base 11, and emitter 13 is established from battery 34 through resistors 19, 20 and 21. The base is (grounded or) made common through capacitor 38. When Circuit A is activated by battery 34 through switch 40, there will be a surge of current to charge up base capacitors 17 and collector capacitor 18. There is also a surge of current through winding 15 which is one winding of transformer 14. This surge of current through winding 15 is inductively coupled to inductance winding 16 of transformer 14. The surge of current in winding 16 is connected to the base 11 of transistor 10 through base capacitor 17. The return current in winding 16 comes from the emitter 13 of transistor 10. The polarity of winding 16 is such that the surge of current into the base 11 of transistor 10 through winding 15 reinforces the current surge in the winding 15 and collector capacitor 18 through the collector 12 of transistor 10. The surge will build up until the transistor 10 is saturated. When the surge ceases, then the coupling through the transformer 14 to the base 11 ceases and collector capacitor 18 discharges through winding 15. The current surge from capacitor 18 in winding 15 is opposite in direction to the first current surge and it is coupled, through inductance winding 16 and base capacitor 17, to the base 11 of transistor 10. Since this base current is opposite to the first surge through transistor 10 action, it drives down the current in the collector 12 from the saturation value. The decreased current in the collector 12 is also coupled to the base 11 through windings 15 and inductance winding 16 of transformer 14 and it adds to the surge in the base 11. This reverse surge will continue until the transistor 10 is cut off and current flow ceases through the transistor 10 and winding 15 of transformer 14. Then the current through winding 15 builds up similar to the first surge and the previous cycle repeats. The cycle from cut-off to saturation and back to cut-off again will be controlled primarily by the values of the inductance of winding 15 and collector capacitor 18, and secondarily by the inductance of inductance winding 16, the capacitance of base capacitor 17 and the current characteristics of transistor 10. In this manner Circuit A provides an oscillation between the saturation and cut-off conditions of transistor 10 at a frequency controlled primarily by the inductance of winding 15 and collector capacitor 18. The voltage at the collector 12 of transistor 10 will be a slightly distorted sine wave. The voltage at the base 11 of transistor 10 is a very distorted sine wave. The distortion in the voltage at the collector 12 is caused by driving the transistor from saturation to cut-off and is used to give a relatively constant alternating voltage at the collector 12 of transistor 10. This alternating voltage at the collector 12 of transistor 10 is coupled through capacitor 43 to Circuit B.

The bias on transistor 10 is adjusted by resistors 19, 20 and 21. The values have been chosen to give a battery current such as to provide a battery life of between 50 and 100 hours.

The oscillator in Circuit A has been described in detail. It is basically a tuned-collector oscillator with tickler feed back, but it is not the only oscillator which could be used. Any circuit which can provide the proper amplitude and frequency can be used. One necessary characteristic of the circuit used for the oscillator in Circuit A beyond that of the output voltage and frequency is the stability of the output voltage. In the circuit used, the cut-off and saturation characteristics of the transistor 10 are used to regulate the oscillation amplitude.

Circuit B is the measuring circuit. It is required, by reading the current in meter, that the resistance between the probes be determined from calibration values. The value of the alternating current in Circuit B is a function of the values of the series circuit composed of potentiometer 22 and 23, resistor 24, capacitor 25, the resistance between negative probes 26 and positive probe 27, and the measuring circuit composed of diodes 29, 30, 31, 32 and micro-amp meter 33. Diodes 29, 30, 31 and 32 are used to enable the direct current micro-amp meter 33 to read alternating current. The four diodes keep the alternating current passing in the same direction through the micro-amp meter 33. During the positive half cycle of the alternating voltage from Circuit A, diodes 29 and 31 will be conducting and the current will flow from plus to minus through micro-amp meter 33. On the negative half cycle of the alternating voltage, diodes 30 and 32 are conducting so that current flows again from positive to negative through micro-amp 33. Thus, for each cycle of the alternating voltage applied to Circuit A, current is caused to flow in the same direction through micro-amp meter 33 so that the meter 33 reads a direct current which is directly proportional to the alternating current in the series circuit.

The amount of alternating current in the series circuit is controlled by the values of potentiometer 22, potentiometer 23, resistor 24, capacitor 25 and the impedance between negative probe 26 and positive probe 27. In order to calibrate the meter reading in terms of the resistance between probes 26 and 27, first, probes 26 and 27 are connected together so that the resistance between the probes is zero. Potentiometer 22 is then adjusted for a reading of 50 microamperes on micro-amp meter 33 using external knob 44. Then the micro-amp meter 33 is calibrated using internal means adjusting potentiometer 23 for a particular resistance connected between the probes 26 and 27. In usual calibration, a resistance of 6,500 ohms closely analagous to the human body is connected between probes 26 and 27 and knob 44 turned and potentiometer 22 is adjusted until micro-amp meter 33 reads 40 microamperes. In the initial adjustment, probes 26 and 27 are shorted and potentiometer 22 adjusted for a current of 50 microamperes through meter 33. Then, potentiometer 23 is readjusted to 40 microamperes with the 6,500 ohm resistor between probes 26 and 27. The adjustments of potentiometers 22 and 23 are repeated until no further variations occur.

This dual resistance calibration (at zero resistance and 6,500 ohms), because of the linear relationship between current and resistance, will permit the calculation of other values of resistance across probes 26 and 27. The calibration is not limited to the one described since other values of resistance and currents could be used.

The main value of capacitor 25 is to make doubly sure that no direct current from the transistor gets through the meter or to the circuit connected across probes 26 and 27. Although capacitor 43 may do this DC blockage well, the double protection offered by capacitor 25 is best for the user.

The voltage levels applied to the measuring circuit are also kept very low to protect the user. When a resistance of 6,500 ohms is across the probes the voltage across the probes is only 250 millivolts.

Figure 2:
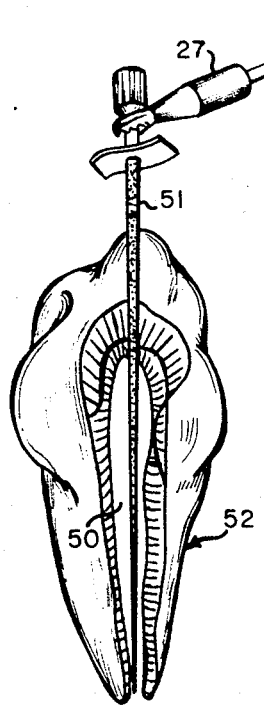
FIG. 2 is a sectional view of a tooth with a root canal file inserted in a simulated operative procedure illustrating the point of contact of periodontal tissue.
Figure 8:
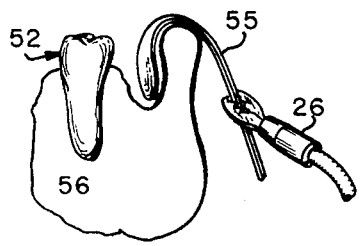
FIG. 8 is a perspective illustration of a type of device which may be used for completing the ground circuit by contacting the saliva and tissue in the mouth.

The device of this invention is exceedingly useful and saves substantial time in endodontic therapy. Prior to use, the circuit must be carefully balanced as previously described. With the circuit in operation the positive probe 27 and negative probe 26 should be interconnected and knob 44 adjusted to give a micro-amp reading of 50. Positive probe 27 is then connected to test terminal 41 which is interconnected through a 6,500 ohm resistance to ground. The instrument in this position should give a reading of 40 micro-amps. Sound endodontic techniques accepted within the dental profession are assumed to be utilized. Particularly referring to FIGS. 2, 3, and 8, the steps of the operation are substantially as follows:

1. The tooth is isolated with a rubber dam and the crown washed and dried. The pulp chamber is opened to expose the root canal 50. The negative probe 26 is connected to a saliva tissue ground 55 or a metal saliva ejector (not shown) or other metal object bathed in the saliva of the mouth.

2. The positive probe 27 is clipped to a root canal file 51 and as the manipulation of the file 51 proceeds down through root canal 50 at the point the micro-amp meter 33 reads 40 file 51 will have just touched periodontal tissue 56. A reading of 41 or more will indicate an overpenetration of the file 51 into the periodontal tissue 56. The filing of all root canals 50 to a meter 33 reading of 40 should insure penetration of the tooth 52 to the exact point of the periodontal tissue 56. The device is also useful in locating accessory canals 53. If a nerve or sensitive area is contacted at a meter 33 reading of less than 40 an accessory canal 53 is probably present.

Figure 7:
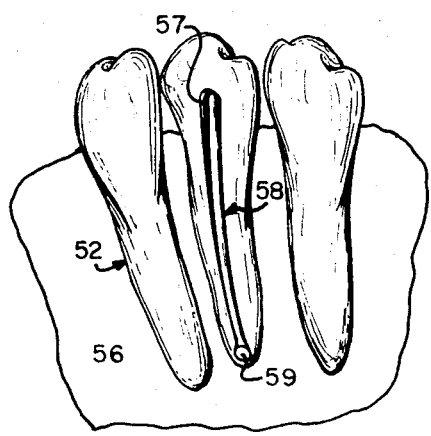
FIG. 7 is a schematic x-ray illustration of a silver point properly sealed in a root canal.

To ascertain the appropriate size of silver points 57 for the endodontic procedure positive probe 27 is attached to a selected point 57. If the point does not penetrate the tooth 52 root canal 50 sufficiently to obtain a meter 33 reading of forth (40) a smaller point should be selected. If a reading above 40 is obtained, the tip of the silver point 57 should be shortened. In the utilization of the device in sealing the silver point 57 in the root canal 50 a non-conductive sealer 58 such as "Kerr Tubli Seal" should be employed. The silver point 57 is covered with the sealer 58 and seated in place. Positive probe 27 is attached to the silver point 57. A reading of approximately 40 on meter 33 indicates an incomplete seal whereas a reading of 25 to 35 indicates a good seal 59, FIG. 7.

In preparation of a vital tooth 52 for a retention pin should blood fluid appear in the hole, a meter reading of 18 to 25 will indicate the pin to be in the pulp area of the tooth. A high reading of approximately 42 will indicate an overpenetration of the tooth 52 and an entry into the periodontal tissue 56. The device is also useful in that high pulp chamber readings may also indicate a fractured molar which results in the current leak through the fracture line.

Having described the construction of the device and its usefulness in endodontic therapy, what is desired to be claimed is all equivalent structures and utilization of the device not departing from structures and techniques and methods heretofore described in detail as defined in the appended claims.

We claim:

1. A device for measuring penetration of a root canal comprising:
    a. a low voltage DC power supply,
    b. a tickle oscillator means converting said DC power supply to AC,
    c. a diode bridge having a first side and a second side, said diode bridge rectifying said AC to DC,
    d. a DC micro-amp meter conductively attached across said diode bridge, said DC micro-amp meter reading converted DC proportional to AC flow,
    e. an electrically conductive tooth probe of a configuration such as to be adapted to penetrate the root canal of a tooth,
    f. an electrically conductive ground probe adapted to conductively contact the tissue of the mouth of the patient,
    g. a common ground interconnecting said DC power supply and said electrically conductive ground probe,
    h. electrical circuit means interconnecting said power supply, said tickle oscillator, said diode bridge, said micro-amp meter, said tooth probe, and said ground probe, said circuit means constructed and arranged to cause the current to flow through said DC micro-amp meter proportionally to the conductivity between said tooth probe and said ground probe and adapted to cause said DC micro-amp meter to measure said conductivity between said probes.

2. The invention of claim 1 wherein:
    a. said DC power supply comprises a battery supplying a DC potential with a negative terminal grounded to said common ground,
    b. said tickle oscillator is attached to the positive terminal of said battery converting the DC to AC and,
    c. a first adjustable potentiometer means positioned in said circuit means on said first side of said diode bridge, said potentiometer means constructed and arranged to permit adjustment of the conductivity of said circuit to adjust the reading of the DC micro-amp meter to measure a selected resistance or known conductivity.

3. The invention of claim 2 wherein said circuit means includes:
    a. a transistor as a component of the said tickle oscillator,
    b. a second potentiometer means positioned in said circuit on means said second side of said diode bridge permitting adjustment of conductivity of the various components of said circuit, and
    c. four solid state diodes interconnected to form said diode bridge interconnecting said tickle oscillator means and said DC micro-amp meter, said diode bridge constructed and arranged to rectify the alternating current output of said tickle oscillator thereby causing said DC micro-amp meter to register AC current flow as proportional DC current flow.

4. The method of measuring the penetration of a root canal probe comprising the steps of:
    a. opening the pulp chamber of the tooth,
    b. activating a low voltage micro-amp measuring device having first and second electrically conductive probes,
    c. grounding said first probe to the tissue of the mouth of the patient,
    d. inserting said second probe into the root canal of the tooth of the patient, and
    e. measuring the conductivity of the tooth between the first and second probes,
    f. determining the point of contact of said second probe with peridontal tissue.

5. The invention of claim 4 including the step of determining the location of accessory root canals.

6. The invention of claim 4 including the step of detecting the existence of fractures in the tooth.

7. The invention of claim 4 including the steps of:
a. inserting a silver point into the root canal,
b. measuring electronically the depth of penetration of said silver point.

8. The invention of claim 7 including the steps of:
a. placing a non-conductive sealer on the said silver point,
b. inserting the said silver point in the root canal of a tooth, and
c. measuring the conductivity thereby determining the effectiveness of the seal.

9. The invention of claim 4 including the step of:
a. placing a non-conductive seal on a silver point,
b. inserting the said silver point in a root canal, and
c. determining the effectiveness of the seal by measuring the conductivity.

* * * * *